UNITED STATES PATENT OFFICE.

SVEN AXEL SJOO AND REINHOLD VIKTOR TORNELL, OF STOCKHOLM, SWEDEN.

PROCESS OF CLEANING BEER VATS AND PIPES.

SPECIFICATION forming part of Letters Patent No. 691,671, dated January 21, 1902.

Application filed December 10, 1900. Serial No. 39,434. (No specimens.)

*To all whom it may concern:*

Be it known that we, SVEN AXEL SJOO, residing at Kungsholmstorg 1, Stockholm, and REINHOLD VIKTOR TORNELL, residing at Garfvaregatan 12ᴀ, Stockholm, Sweden, subjects of the King of Sweden and Norway, have invented an Improved Process for Cleaning Beer Vats and Pipes, (for which we have applied for a patent in Sweden, dated May 20, 1899; in Germany, dated February 28, 1900; in Norway, dated November 8, 1900; in Austria, dated November 8, 1900, and in Denmark, dated November 9, 1900,) of which the following is a specification.

It is well known that in the fermentation industries the work of cleaning plays an important part, and the difficulties connected therewith are likewise well known. In breweries, for instance, the rests of malt, wort, beer, and yeast depositing in various places form an excellent nourishment for bacteria, mold, and yeast, which propagate rapidly and coat the objects with a tough slime, which is very difficult to remove. If these organic remainders come into contact with the wort and beer, many being the opportunities therefor, they cause bad taste and other inconvenience, and the micro-organisms contained in them produce various changes in the beer, causing the latter to deteriorate in quality. To afford protection against these disturbances in the regular manufacture, cleaning and disinfecting means is employed. To the former belong cold and hot water and carbonate of soda in solution. The organic rests can be partially, not fully, removed by washing and brushing with said cleaning means, the latter not having a sufficient dissolving effect on the slime and proteinous matter of which the rests generally consist, and an efficient cleaning, therefore, is not attained. For killing the micro-organisms resort must, moreover, be had to some disinfectant. The disinfectants having found any extended application in the fermentation industries are steam, bisulfite of lime, and freshly-slaked lime. Steam, however, can be used only on special occasions and often injures the material. The bisulfite of lime is not very efficient, being unable to dissolve the organic matter, and as a result the latter is sterilized on the surface only. Besides, it develops such intense smell that it is difficult to work with. In using slaked lime the work of cleaning is very troublesome. The lime must be freshly slaked, as in the air of the brewery, rich in carbonic acid, it rapidly changes into carbonate of lime. It cannot be used everywhere, and it frequently injures the objects operated on.

A satisfactory cleaning agent must be capable of dissolving and loosening the organic matter. It must, moreover, be handy to work with and be applicable everywhere without causing damage. We have found such an agent in a mixture of hypochlorite of alkali and hydrate of alkali. The hypochlorite is an excellent slime-dissolver, as may be evident from the following experiments. An agent known as a "slime-dissolving" means is hydrate of soda, and trials were made with it for comparing the effects produced by the different means. For this purpose the insides of glass goblets were coated with yeast, which was allowed to become putrid, so that a tough slime was deposited on the inside. For removing said slime a period of action of five hours was required when using a solution of hypochlorite of soda containing 0.32 per cent. of active chlorin. A seven-per-cent. soda-lye (hydrate of soda) did not remove the slime until one day had elapsed. A five-per-cent. and 2.5-per-cent. lye failed to remove the slime in three days. The hypochlorite accordingly proves to be an extremely efficient slime-dissolver, a property first demonstrated by the inventors; but a mixture of hypochlorite of an alkali and hydrate of an alkali acts to dissolve organic matter in a still higher degree than the hypochlorite alone. Under the conditions above stated a mixture of hypochlorite of soda containing 0.32 per cent. active chlorin and 0.32 per cent. sodium hydrate removed the slime in three hours. Other advantages are also gained by the addition of hydrate of alkali to the hypochlorite. A neutral solution of hypochlorite of alkali is extremely inconsistent, especially if exposed to the air, rich in carbonic acid, in the fermentation-cellar. During one trial the neutral solution had lost 68.08 per cent. of the active chlorin in the same time as the same solution containing hydrate of soda had lost only 2.85 per cent.

The neutral salt spreads an intense smell, which is highly offensive to the workman, whereas this smell is almost entirely done away with by the addition of hydrate.

Owing to its high oxidizing power the hypochlorite, moreover, operates to kill instantaneously all micro-organisms, so that subsequent disinfection is superfluous. Owing to the aforesaid slime-dissolving property the organic rests become soaked through and thoroughly sterilized, whereas the disinfectant hitherto universally employed—viz., bisulfite of lime—does not dissolve the organic substance, which consequently is sterilized on the surface only, the organisms remaining unkilled in its inner parts. The bisulfite of lime for this reason is of very little use, as is further evident from the following experiment undertaken in practice with fermenting-vats under exactly similar conditions. The hypochlorite solution contained 0.25 to 0.3 per cent. of active chlorin. The bisulfite of lime was used at the degree of concentration customary in the brewery where the trial was made:

|  | Trial 1. | Trial 2. | Trial 3. | Trial 4. |
|---|---|---|---|---|
| Number of micro-organisms in the fermenting-vat after washing with— |  |  |  |  |
| Hypochlorite-of-alkali solution | 0 | 0 | 0 | 0 |
| Bisulfite of lime | 108,500,000 | 23,400,000 | 448,000,000 | 49,600,000 |

The most advantageous composition is one-half to one part hydrate of alkali to one part hypochlorite of alkali. A smaller amount of hydrate is insufficient for several reasons, and a greater proportion thereof has proved to decrease the disinfecting property of the preparation.

The preparation can be produced in various ways, the simplest method being by decomposing chlorid of lime by means of carbonate of soda, separating the solution of hypochlorite of soda formed and the lime precipitate, and adding hydrate of soda to the former. If the quantities are computed in such a manner that the product will contain ten per cent. hypochlorite and five to ten per cent. hydrate, the product may in most cases be diluted with twenty parts water for practical use.

The new preparation accordingly possesses the following advantages: It dissolves and removes all organic rests. It dissolves the hard deposit ("Bierstein" in German) on the walls of the fermenting-vats that is the cause of many infections. (Compare *Böhmische Bierbrauer*, 1900, No. 19, "Localgeschmack des Bieres.") It cleans the beer and wort pipes without the need of taking them apart. (As to wort-rests and a brown deposit in pipes compare Thausing *Malzbereitung und Bierfabrikation*, fifth edition, pages 632 and 633.) It kills instantaneously all micro-organisms. It can be used everywhere. It does not injure the objects operated on, whether metallic pipes, rubber hose, or vats, &c. It is used cold and highly diluted. It purifies the air of the factory-rooms. It is very handy to work with and greatly facilitates the cleaning operation.

In view of the fact that a mixture of alkaline hypochlorite and alkaline hydrate accordingly constitutes in all respects an excellent cleaning means for the fermentation industry, we claim as our invention and desire to secure by Letters Patent—

The herein-described process for cleaning the walls of vats or pipes in breweries to dissolve and remove deposits therefrom and disinfect the vats and pipes, said process consisting in subjecting the walls of said vats or pipes to the action of a solution composed of about one part of alkaline hypochlorite with about a half to one part of alkaline hydrate, substantially as specified.

In witness whereof we have hereunto set our hands in the presence of two witnesses.

SVEN AXEL SJOO.
REINHOLD VIKTOR TORNELL.

Witnesses:
ERIK MORELL,
JOHAN NORIN.